Feb. 26, 1946.  F. W. HECKERT  2,395,661
BOOSTER PUMP AND TANK ASSEMBLY
Filed Jan. 5, 1944
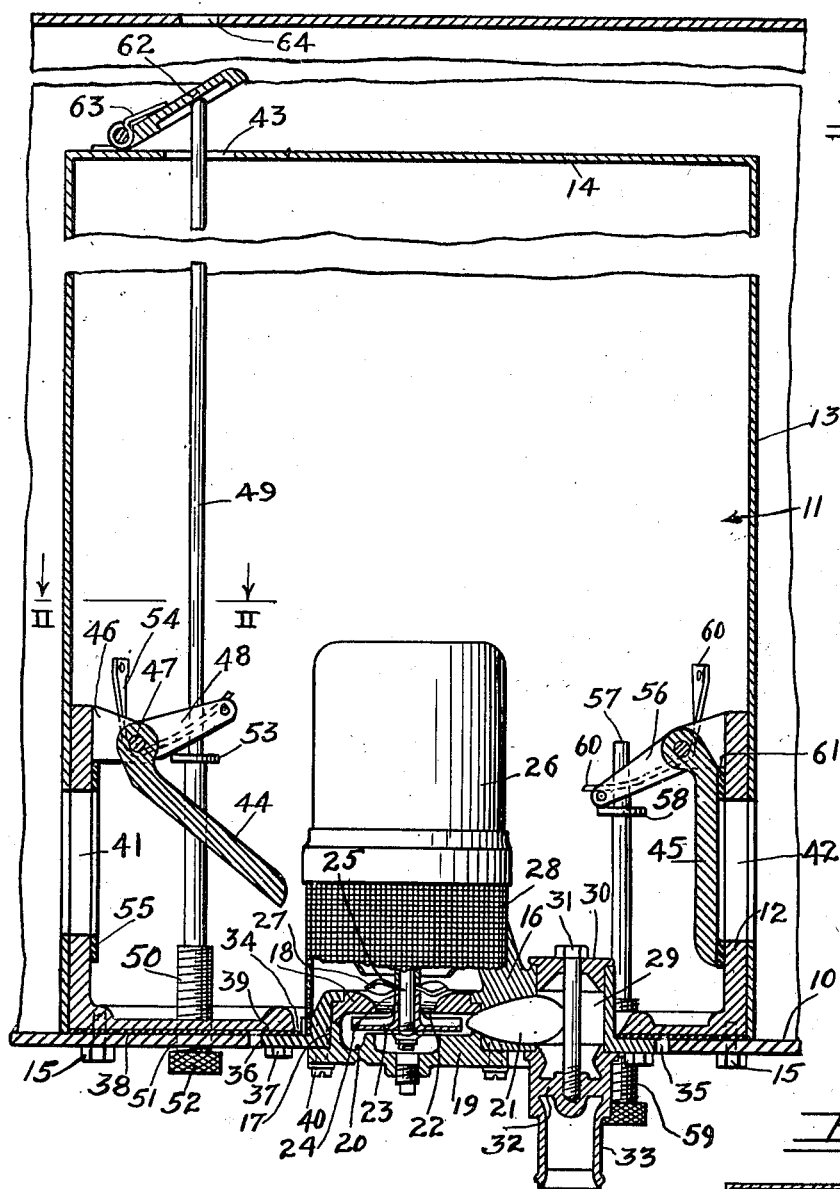
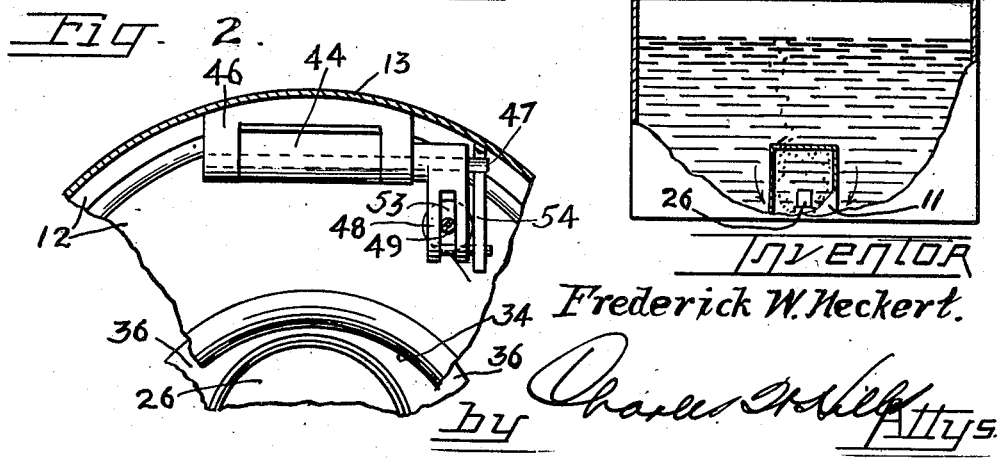
INVENTOR
Frederick W. Heckert.

Patented Feb. 26, 1946

2,395,661

UNITED STATES PATENT OFFICE 2,395,661

BOOSTER PUMP AND TANK ASSEMBLY

Frederick W. Heckert, Dayton, Ohio, assignor to Curtis Pump Company, Dayton, Ohio, a corporation of Ohio Application January 5, 1944, Serial No. 517,031

4 Claims. (Cl. 222—385)

This invention relates to fuel systems and particularly to improved arrangement for auxiliary pumps, such as booster pumps in aircraft fuel systems, for assuring adequate and proper fuel supply to the engines. In aircraft construction, available space for accessories is very limited and in view of this booster pump units have been mounted entirely within airplane fuel tanks in order to permit space outside of the fuel tank, which might otherwise be used for the pump, to be available for other requirements. Such mounting of pump units is disclosed in Curtis Patent No. 2,312,526 dated March 2, 1943, where a complete booster pump unit is entirely within the fuel space in an airplane wing to be submerged in the fuel.

Booster pumps must be periodically serviced to be cleaned, and many times repairs or readjustments may be necessary. Therefore, like in the Curtis patent referred to, provision is made for withdrawal of the entire pump unit from the tank. However, with the arrangement such as in this Curtis patent, before the pump unit can be withdrawn, the tank must be empty, or must first be drained.

An important object of my invention is to provide means which will make it unnecessary to wait until the fuel tank is empty or to drain the tank before the pump unit is withdrawn from the tank. This I accomplish by providing within the main tank a small compartment into which the pump unit is inserted and which compartment is normally open to fuel flow from the main tank to the pump but which may be entirely shut off from the main tank when the pump is to be removed for inspection or repairs, so that drainage of only a small quantity of fuel which might be within the small compartment would be necessary.

Another object of the invention is to provide passageway for flow of fuel from the main tank into the small compartment together with closure means for these passageways operable from the exterior of the tank or compartment to be closed to shut off the compartment when the pump unit is to be withdrawn therefrom. Where the booster pump is of the type which functions to beat vapor or gas bubbles out of the fuel before delivery from the pump, provision is made to vent this gas or vapor out of the top of the pump compartment, and closure means are provided for the vent outlet which may be opened and closed in conjunction with the opening and closure of the flow passageways into the compartment or may be separately opened and closed from the exterior of the fuel tank or compartment.

The various features of my invention are embodied in the structure shown on the drawing, in which:

Figure 1 is a section of a portion of a main fuel tank and a small tank therein providing a compartment for the pump unit which is partially shown in section;

Figure 2 is a section on plane II—II of Figure 1; and

Figure 3 is a more or less diagrammatic view to reduced scale of a main tank and a smaller tank therein for the pump unit and which shows the escape of gas and vapor bubbles from the smaller tank.

Referring to Figure 1, 10 represents a main fuel tank structure which may be a separate tank or may be part of an airplane wing structure. Within this main tank is located a smaller or auxiliary tank 11 which is shown as being of cylindrical shape. This tank comprises the cylindrical base 12 which receives the cylindrical wall 13 closed at the top by the wall 14. The auxiliary tank is located at any convenient point in the main tank to be supported on the bottom thereof and secured as by screws 15 threading into the base.

Briefly describing the booster pump structure shown, it comprises the casing 16 having the opening 17 for receiving the throat ring 18 and the base 19, the throat ring and base defining the volute chamber 20 whose outlet end 21 extends through the side of the casing. The throat ring has the throat 22 for fuel flow into the volute chamber 20 in which is located the impeller 23 supported on a sleeve 24 secured to the shaft 25 of an electric motor 26. Above the throat, the sleeve supports a propeller or beater 27 so that the impeller and beater are rotated together by the motor. A screen 28 extends between the casing and the motor through which fuel must pass to reach the chamber 20 and through which the gas or vapor bubbles beaten out of the fuel by the beater 27 escape so that only fuel in full liquid condition may reach the volute chamber from which it is pumped by the impeller.

Through one side of the casing extends the vertical passageway 29 which communicates with the outlet 21 of the volute chamber. A plug 30 closes the upper end of the passageway 29 through which plug extends a screw 31 for engagement with the cross-bar 32 in the coupling fitting 33 for securing this fitting to the casing across the lower end of the passageway 29, the pump fluid flowing through the fitting and through piping or other condits (not shown) for flow of the fuel to a point of consumption.

The bottom wall of the auxiliary tank base 12 has the circular opening 34 therethrough through which the pump unit is inserted into the auxiliary tank. The bottom of the main tank 10 has the opening 35 therethrough concentric with but of somewhat larger diameter than the auxiliary tank opening 34, and the pump casing 16 has the base or supporting flange 36 engaging within the main tank opening 35 and abutting the auxiliary tank base around the opening 34 to be detachably secured as by screws 37. Preferably a sealing washer 38 is interposed between the bottom of the auxiliary tank and the bottom of the main tank, and a sealing washer 39 is interposed between the flange 36 and the auxiliary tank bottom. When the screws 37 are withdrawn, the entire pump unit may be removed from the auxiliary tank through the opening 34. The bottom wall or base 19 of the volute chamber 20 is also detachably secured to the pump casing, as by screws 40 so that access may be had to the interior of the pump without removal of the entire pump structure from the auxiliary tank.

Near the bottom of the auxiliary tank one or more openings are provided for flow of the fuel from the main tank into the auxiliary tank. As shown, two openings 41 and 42 are shown at opposite sides of the tank. In the top of the auxiliary tank an opening 43 is provided for escape into the main tank of the vapor and gas bubbles driven out of the pump structure by the beater element, these bubbles rising up through the fluid in the auxiliary tank and out of the vent opening 43 into the main tank, as illustrated on Figure 3. The openings in the tank must be closed to shut off or isolate the tank entirely from the main tank fuel before the pump structure is withdrawn in order that it will be necessary to drain only whatever fuel is within the auxiliary tank when the pump structure is withdrawn. Closure members for the openings are therefor provided. As shown, a gate valve 44 is provided for the opening 41 and a similar gate valve 45 is provided for the opening 42; these gate valves being within the auxiliary tank. Valve 44 is hinged on a bracket 46 extending from the base 12 of the auxiliary tank, the hinge pin 47 having a bifurcated arm 48 extending therefrom for receiving a rod 49. At its lower end the rod terminates in a sleeve 50 threading through aligned openings 51 in the bottom walls of the two tanks, the sleeve terminating at its lower end in a knurled head 52. Upon turning of the sleeve, the rod 49 will be shifted longitudinally. Below the arm 48 of the valve hinge pin the rod 49 has the abutment collar 53. When the sleeve 50 is turned for upward movement of the rod, this collar will engage the arm 48 to swing the valve 44 open, and when the sleeve 50 is withdrawn for downward movement of the rod and the collar 53, a spring 54 will swing the valve down to close the openings 41, a seating washer 55 being provided around the opening for tight closure of the valve.

The control for the valve structure 45 may be the same as that for the valve 44, the arm 56 extending from the valve pin receiving a rod 57 with an abutment collar 58 thereon and terminating at its lower end in a sleeve 59 threading through the bottom walls of the two tanks, a spring 60 closing the valve when the rod 57 is withdrawn, and a washer 61 assuring tight closure of the valve.

For the vent 43 at the top of the auxiliary tank, a gate valve 62 is shown, a spring 63 tending to swing this valve down for closure of the opening. Separate means may be provided for controlling this valve but, as shown, the rod 49 may function for control of this valve. The length of the rod is such that when it is shifted up for opening of valve 44 it will also open valve 62, and when it is shifted down to release the valve 44 for closure by its spring 55, the rod will also release the valve 62 for closure by its spring 63.

The valve 45 is shown on Figure 1 as being closed, but when the pump is in service, both the valves 44 and 45 and the vent valve 62 will be open for flow of fuel from the main tank into the auxiliary tank and for escape of driven out vapor and gas through the vent 43 into the main tank from where it may escape through the vent opening 64. When the entire pump structure is to be withdrawn all of these valves are first closed.

It will be apparent that my improved arrangement and control eliminates the necessity of draining the main tank of fuel or waiting until the tank is empty before the pump unit is withdrawn from its service position. With my improved arrangement, where the auxiliary tank is very small in comparison with the size of the main tank, only the small volume of fuel within the auxiliary tank after closure thereof by the valves will be drained when the pump structure is withdrawn. The controls for the auxiliary tank valves being accessible from the exterior of the tank, the valves can be quickly opened or closed.

I have shown a practical and efficient embodiment in the features of my invention but I do not desire to be limited to the exact construction, arrangement and operation shown and described as changes and modifications may be made without departing from the scope of the invention.

I claim as my invention:

1. In a fuel system, a main fuel tank having an opening in its bottom wall, a small auxiliary tank within said main tank having sealing engagement with the main tank bottom to span said opening, said auxiliary tank having an opening in its bottom in alinement with the main tank bottom opening, a vapor releasing booster pump unit insertable through said auxiliary tank bottom opening and having a mounting flange engaging the auxiliary tank bottom around its opening whereby said pump unit may be supported in the auxiliary tank or may be withdrawn therefrom, said pump having a pump chamber and an inlet for flow of fuel from said auxiliary tank into said pump chamber, said pump having an outlet from said pump chamber to the exterior of said tanks for the pumped fluid, said auxiliary tank having an inlet opening for flow of fuel thereinto from the main tank, a closure for said auxiliary tank fuel inlet, said auxiliary tank having a vapor vent outlet at the top thereof and a closure therefor, and setting means accessible at the exterior of said tanks for controlling said closures, said closures when set to closing position entirely isolating said auxiliary tank from the fuel in said main tank whereby when said pumping unit is then withdrawn from said auxiliary tank only the fuel at that time within the auxiliary tank need be drained.

2. In combination, a main tank for fluid having an opening in one of its walls, an auxiliary tank within said main tank spanning said opening, a pumping unit insertable into said auxiliary tank through said opening and detachably secured to form a closure for the auxiliary tank, said pump unit having an inlet communicating with the lower portion of the interior of said auxiliary tank, means on said pump for ejecting bubbles of gas and vapor away from the pump inlet, said pump having an outlet communicating with the exterior of the main tank, a vent in the upper portion of the main tank, said auxiliary tank having an opening in the upper portion thereof communicating with said main tank, said auxiliary tank having an additional opening in the lower portion thereof communicating with said main tank, spring pressed valves cooperating with said openings in the auxiliary tank to close said openings, and a single valve actuator accessible from the exterior of said main tank for opening said valves to vent fluid from the main tank into the auxiliary tank and to release bubbles ejected by the pump through the opening in the upper portion of the auxiliary tank for release of gases and vapors through the vent in the main tank.

3. In a fuel system, a main fuel tank having an opening in its bottom wall, an auxiliary tank within said main tank spanning said opening and having an opening in its base registering with the opening in the bottom wall of the main tank, a pump unit in said auxiliary tank having a mounting base forming a closure for said opening of the auxiliary tank, said pumping unit adapted to be inserted from outside of said main tank into said auxiliary tank and having an inlet communicating with the lower portion of said auxiliary tank, means on said said pump for flowing bubbles of gas and vapor away from the pump inlet, said pump having an outlet communicating with the exterior of the main tank, a vent in the top of said main tank, a second vent in the top of said auxiliary tank communicating with said main tank, an inlet opening in the lower portion of said auxiliary tank communicating with the lower portion of said main tank, valves for closing said second vent and said inlet opening in the lower portion of the auxiliary tank, means accessible from outside of the main tank for actuating said valves to opened and closed positions whereby said second vent will release bubbles from the auxiliary tank into the main tank for escape of gases and vapors through said first vent and said inlet in the lower portion of the auxiliary tank will supply fuel from the main tank into the auxiliary tank to feed said pump when said valves are opened and whereby said pump can be removed without draining said main tank when said valves are closed.

4. In a fuel system, a main fuel tank having an opening in its bottom wall, a small auxiliary tank within said main fuel tank spanning said opening and having an opening in its bottom registering with said opening, an electric motor and pump unit insertable through said opening in said auxiliary tank having a mounting base closing said opening in said auxiliary tank, the pump of said unit having an inlet communicating with the lower portion of said auxiliary tank and a propeller for flowing bubbles of gas and vapor away from said pump inlet, a bubble releasing vent in the top of said auxiliary tank, an inlet opening in the lower portion of said auxiliary tank communicating with said main tank, valves for closing said vent and said inlet opening, and a single actuator extending to the exterior of said main tank for controlling said valves to feed fuel into the main tank and to release bubbles from the auxiliary tank when the valves are opened while permitting removal of said electric motor and pump unit without draining said main tank when said valves are closed.

FREDERICK W. HECKERT.